United States Patent
Buttridge et al.

(10) Patent No.: US 9,597,650 B2
(45) Date of Patent: Mar. 21, 2017

(54) SYSTEM FOR IMPROVED REACTANT MIXING AND DISTRIBUTION

(75) Inventors: Ian G. Buttridge, Garland, TX (US); SooWoong Kim, Flower Mound, TX (US); Michael J. Binkley, Glenn Heights, TX (US)

(73) Assignee: GTC Technology US LLC, Houston, TX (US)

( * ) Notice: Subject to any disclaimer, the term of this patent is extended or adjusted under 35 U.S.C. 154(b) by 47 days.

(21) Appl. No.: 13/449,122

(22) Filed: Apr. 17, 2012

(65) Prior Publication Data
US 2012/0300577 A1 Nov. 29, 2012

Related U.S. Application Data

(60) Provisional application No. 61/476,494, filed on Apr. 18, 2011.

(51) Int. Cl.
| | |
|---|---|
| *B01D 3/32* | (2006.01) |
| *B01D 3/20* | (2006.01) |
| *B01J 8/04* | (2006.01) |
| *B01J 8/00* | (2006.01) |
| *C10G 49/00* | (2006.01) |

(52) U.S. Cl.
CPC ............ *B01J 8/0453* (2013.01); *B01J 8/008* (2013.01); *B01J 8/0492* (2013.01); *C10G 49/00* (2013.01); *B01J 2208/00849* (2013.01); *B01J 2208/00902* (2013.01); *B01J 2208/00929* (2013.01); *B01J 2208/00938* (2013.01)

(58) Field of Classification Search
CPC .. B01F 5/00; B01F 5/06; B01F 5/0602; B01F 5/0603; B01F 5/0604; B01F 5/0605; B01F 5/0606; B01F 5/0608; B01F 5/0682; B01F 5/0687; B01F 5/0688; B01F 5/0691; B01F 13/00; B01F 13/02; B01F 15/00915; B01F 15/02; B01F 15/0203; B01F 15/0274; B01F 15/0292; B01F 2005/00; B01F 2005/0088; B01F 2005/0094; B01F 2215/0036; B01F 2215/0086; B01J 8/0492; B01J 8/0453
USPC .......................... 366/336, 340, 175.1–175.2
See application file for complete search history.

(56) References Cited

U.S. PATENT DOCUMENTS

| | | |
|---|---|---|
| 1,027,874 A | 5/1912 | Pilling |
| 2,582,826 A | 1/1952 | Glitsch |

(Continued)

FOREIGN PATENT DOCUMENTS

EP 010877 B1 3/1983

OTHER PUBLICATIONS

Kim, SooWoong et al., "U.S. Appl. No. 13/401,601," filed Feb. 21, 2012.

(Continued)

*Primary Examiner* — Tony G Soohoo
*Assistant Examiner* — Anshu Bhatia
(74) *Attorney, Agent, or Firm* — Winstead PC

(57) ABSTRACT

One aspect of the present invention relates to a mixing system for use in a chemical-process column. The mixing system includes a heavy-reactant mixing surface arranged perpendicular to a flow of reactant through the chemical-process column. The mixing system also includes an aperture formed in the heavy-reactant mixing surface. A pre-distributor is coupled to an underside of the mixing system and fluidly coupled to the aperture.

11 Claims, 11 Drawing Sheets

(56) References Cited

U.S. PATENT DOCUMENTS

| | | |
|---|---|---|
| 2,611,457 A | 9/1952 | Glitsch |
| 2,718,901 A | 9/1955 | Nutter |
| 2,752,139 A | 6/1956 | Huggins |
| 2,752,229 A | 6/1956 | Brown et al. |
| 2,787,453 A | 4/1957 | Hibshman et al. |
| 2,853,281 A | 9/1958 | Hibshman et al. |
| 2,903,251 A | 9/1959 | Thrift |
| 2,951,691 A | 9/1960 | Nutter |
| 3,039,751 A | 6/1962 | Versluis |
| 3,048,957 A | 8/1962 | Middleton |
| 3,080,155 A | 3/1963 | Glitsch et al. |
| 3,087,711 A | 4/1963 | Glitsch |
| 3,143,482 A | 8/1964 | McLeod et al. |
| 3,146,280 A | 8/1964 | Forgrieve |
| 3,233,708 A | 2/1966 | Glitsch |
| 3,245,669 A | 4/1966 | Huggins et al. |
| 3,282,576 A | 11/1966 | Bruckert et al. |
| 3,287,004 A | 11/1966 | Nutter |
| 3,338,566 A | 8/1967 | Kittel |
| 3,399,871 A | 9/1968 | Bon |
| 3,463,464 A | 8/1969 | Nutter et al. |
| 3,729,179 A | 4/1973 | Keller |
| 3,759,494 A | 9/1973 | Axelrod et al. |
| 3,959,419 A | 5/1976 | Kitterman |
| 4,120,919 A | 10/1978 | McClain |
| 4,133,852 A | 1/1979 | DiNicolantonio et al. |
| 4,174,363 A | 11/1979 | Bruckert |
| 4,201,626 A | 5/1980 | Asdigian |
| 4,207,174 A | 6/1980 | Christman |
| 4,247,521 A | 1/1981 | Forte et al. |
| 4,275,021 A | 6/1981 | Kirkpatrick et al. |
| 4,374,786 A | 2/1983 | McClain |
| 4,499,035 A | 2/1985 | Kirkpatrick et al. |
| 4,504,426 A | 3/1985 | Chuang et al. |
| 4,519,960 A | 5/1985 | Kitterman et al. |
| 4,528,068 A | 7/1985 | Fiocco et al. |
| 4,543,218 A | 9/1985 | Bardo et al. |
| 4,543,219 A | 9/1985 | Yamato et al. |
| 4,550,000 A | 10/1985 | Bentham |
| 4,597,916 A | 7/1986 | Chen |
| 4,603,022 A | 7/1986 | Yoneda et al. |
| 4,604,247 A | 8/1986 | Chen et al. |
| 4,710,326 A | 12/1987 | Seah |
| 4,729,857 A | 3/1988 | Lee et al. |
| 4,816,191 A | 3/1989 | Berven et al. |
| 4,842,778 A | 6/1989 | Chen et al. |
| 4,855,089 A | 8/1989 | Michels |
| 4,909,967 A | 3/1990 | Binkley et al. |
| 4,933,047 A | 6/1990 | Bannon |
| 4,956,127 A | 9/1990 | Binkley et al. |
| 4,981,265 A | 1/1991 | Buhlmann |
| 5,051,214 A | 9/1991 | Chen et al. |
| 5,098,615 A | 3/1992 | Resetarits |
| 5,106,556 A | 4/1992 | Binkley et al. |
| 5,120,474 A | 6/1992 | Binkley et al. |
| 5,147,584 A | 9/1992 | Binkley et al. |
| 5,164,125 A | 11/1992 | Binkley et al. |
| 5,192,465 A | 3/1993 | Petrich et al. |
| 5,192,466 A | 3/1993 | Binkley |
| 5,277,848 A | 1/1994 | Binkley et al. |
| 5,453,222 A | 9/1995 | Lee et al. |
| 5,468,425 A | 11/1995 | Nutter |
| 5,547,617 A | 8/1996 | Lee et al. |
| 5,573,714 A | 11/1996 | Monkelbaan et al. |
| 5,762,834 A | 6/1998 | Hauser et al. |
| 5,783,119 A | 7/1998 | Ulrich et al. |
| 5,895,608 A | 4/1999 | Lee et al. |
| 5,906,773 A | 5/1999 | Hausch et al. |
| 5,911,922 A | 6/1999 | Hauser et al. |
| 5,921,109 A | 7/1999 | Billingham et al. |
| 5,948,211 A | 9/1999 | Yeoman et al. |
| 6,053,484 A | 4/2000 | Fan et al. |
| 6,068,244 A | 5/2000 | Burton et al. |
| 6,089,550 A | 7/2000 | Petschauer et al. |
| 6,113,079 A | 9/2000 | Urbanski et al. |
| 6,145,816 A | 11/2000 | Chuang et al. |
| 6,224,043 B1 | 5/2001 | Fan et al. |
| 6,293,526 B1 | 9/2001 | Fischer et al. |
| 6,422,539 B1 | 7/2002 | Burton et al. |
| 6,502,806 B2 | 1/2003 | Richardson |
| 6,540,213 B2 | 4/2003 | Bachmann et al. |
| 6,568,663 B1* | 5/2003 | Xu et al. .................... 261/114.1 |
| 6,575,437 B2 | 6/2003 | Fischer et al. |
| 6,588,736 B1 | 7/2003 | Chuang et al. |
| 6,592,106 B1 | 7/2003 | Eaton, Jr. |
| 6,629,687 B1 | 10/2003 | Gage |
| 6,722,639 B2 | 4/2004 | Ender et al. |
| 6,736,378 B2 | 5/2004 | Colic et al. |
| 6,739,585 B1 | 5/2004 | Urbanski et al. |
| 6,755,943 B1 | 6/2004 | Mizutani et al. |
| 6,799,752 B2 | 10/2004 | Wu et al. |
| 6,962,661 B2 | 11/2005 | Northup, Jr. et al. |
| 7,045,103 B2 | 5/2006 | McDougald et al. |
| 7,052,654 B2 | 5/2006 | McDougald et al. |
| 7,078,002 B2 | 7/2006 | Van Vliet et al. |
| 7,125,004 B2 | 10/2006 | Dollie et al. |
| 7,125,005 B2 | 10/2006 | Colic et al. |
| 7,155,801 B2 | 1/2007 | Hammon et al. |
| 7,235,158 B2 | 6/2007 | Matsumoto et al. |
| 7,270,315 B2 | 9/2007 | Burton et al. |
| 7,282,118 B2 | 10/2007 | Mitsumoto et al. |
| 7,540,476 B2 | 6/2009 | Pilling et al. |
| 7,556,734 B2 | 7/2009 | Lee et al. |
| 7,712,728 B2 | 5/2010 | Kehrer |
| 7,896,039 B2 | 3/2011 | Bachmann et al. |
| 8,006,716 B2 | 8/2011 | Zhang et al. |
| 8,517,354 B1 | 8/2013 | Binkley |
| 8,720,870 B2 | 5/2014 | Pilling et al. |
| 2002/0041040 A1 | 4/2002 | Fischer et al. |
| 2003/0067085 A1* | 4/2003 | Shakur et al. ................. 261/100 |
| 2004/0037759 A1* | 2/2004 | Van Vliet et al. ............. 422/195 |
| 2004/0151643 A1* | 8/2004 | McDougald et al. ......... 422/194 |
| 2004/0182013 A1 | 9/2004 | Kehrer |
| 2007/0126134 A1 | 6/2007 | Xu et al. |
| 2007/0295591 A1 | 12/2007 | Mosler |
| 2008/0018003 A1 | 1/2008 | Pilling et al. |
| 2008/0245651 A1 | 10/2008 | Werlen et al. |
| 2008/0277260 A1 | 11/2008 | Binkley et al. |
| 2010/0288624 A1 | 11/2010 | Kim et al. |
| 2011/0278745 A1 | 11/2011 | Pilling et al. |
| 2012/0024977 A1 | 2/2012 | Buttridge et al. |
| 2012/0118399 A1 | 5/2012 | Binkley et al. |
| 2012/0211347 A1 | 8/2012 | Kim et al. |
| 2012/0300577 A1 | 11/2012 | Buttridge et al. |

OTHER PUBLICATIONS

Buttridge, Ian et al., "U.S. Appl. No. 13/449,122," filed Apr. 17, 2012.
Binkley, Michael, "U.S. Appl. No. 12/408,333," filed Mar. 30, 2009.
Buttridge, Ian G. "U.S. Appl. No. 12/418,189" filed Apr. 3, 2009.
Buttridge, Ian G., "U.S. Appl. No. 13/564,881," filed Aug. 2, 2012.
Kister, Henry Z., "Distillation Design", ch. 6, pp. 265, 296, 331, 299-301, ch. 7, pp. 382394, ch. 9, pp. 537-554, McGraw-Hill, 1992.
Binkley, Michael J., "U.S. Appl. No. 13/951,159" filed Jul. 25, 2013.
U.S. Appl. No. 12/408,333, Binkley.
U.S. Appl. No. 12/775,895, Kim, SooWoong et al.
U.S. Appl. No. 12/418,189, Buttridge et al.
U.S. Appl. No. 13/101,638, Buttridge et al.
U.S. Appl. No. 13/101,601, Kim, SooWoong et al.
U.S. Appl. No. 13/340,245, Binkley, et al.
Glitsch, Inc., "Ballast Tray Design Manuel", Bulletin 4900, Sixth Edition, 1993, (40 pages).
Axens IFP Group Technologies, "Equiflow Reactor Internals for Optimal Catalyst Utilization", Axens Process Licensing, Jun. 2006, 4 pages.
GTC Technology, "GT-BenZap Technology Licensing". Engineered to Innovate, 2009, 2 pages.
Shell, "Shell Global Solutions' Portfolio for Reactor Engineering Technology", Shell Global Solutions, 2002, 3 pages.

(56) References Cited

OTHER PUBLICATIONS

Young, Lee W., "International Search Report" for the International Application PCT/IB11/02695 as mailed Apr. 17, 2012. (4 pages).
Pilling Mark, et al., Mini Valve, Hydrocarbon Engineering, Apr. 2013 [3 pages].

* cited by examiner

SYSTEM FOR IMPROVED REACTANT MIXING AND DISTRIBUTION

CROSS-REFERENCE TO RELATED APPLICATIONS

This application claims priority to, and incorporates by reference for any purpose the entire disclosure of, U.S. Provisional Patent Application No. 61/476,494, filed Apr. 18, 2011.

BACKGROUND

Field of the Invention

The present application relates generally to hydrotreating processes and more particularly, but not by way of limitation, to improved methods and systems for reactant mixing and distribution in hydrotreating reactors.

History of the Related Art

Hydrotreating refers to a class of catalytic chemical processes for removing impurities such as sulfur, benzene, or the like from petroleum products such as, for example, gasoline, kerosene, diesel fuel, and the like. The purpose of hydrotreating is to reduce emission of pollutants that result from combustion of petroleum products utilized in automotive vehicles, aircraft, railroad locomotives, ships, gas or oil burning power plants, residential or industrial furnaces, and other forms of fuel combustion.

An example of a common hydrotreating reaction involves removal of sulfur from various petroleum products. Such a hydrotreating reaction is referred to as "hydrodesulfurization." Hydrodesulfurization is of particular importance because sulfur, even in low concentrations, may poison metallic catalysts such as, for example, platinum and rhenium, that are used in refining processes to upgrade an octane rating of petroleum products. Furthermore, sulfur dioxide ($SO_2$) results from combustion of sulfur-contaminated petroleum products. $SO_2$ is a widely-recognized pollutant, which has well-known and wide-ranging detrimental effects on the environment.

Another example of a common hydrotreating reaction involves removal of benzene from petroleum products. In recent years, the Federal government has specified maximum acceptable quantities of benzene that may be present in petroleum products. Thus, refinery operators are required to either capture or destroy benzene present in petroleum products. Capture of benzene represents a substantial capital investment for a refinery. Hydrotreating of benzene is a substantially cheaper alternative and involves reacting a benzene-contaminated petroleum product with hydrogen vapor ($H_2$) in the presence of a catalyst. As a result, benzene is degraded into cyclohexane.

In an industrial hydrotreating unit, such as those found in a refinery, hydrotreating takes place in a reactor column at temperatures ranging from about 300° C. to about 400° C. and pressures ranging from about 30 atmospheres to about 130 atmospheres. Typically, hydrotreating takes place in the presence of a catalyst. Typically, the catalyst is in the form of generally spherical pellets that are packed into various portions of the reactor column known as packed beds.

In operation, reactants descend in a concurrent-flow manner through the reactor column. In most cases, small gaps are present between adjacent catalyst pellets thereby allowing passage of reactants therethrough. The hydrotreating reaction occurs on a surface of the catalyst pellets. In many cases, during operation, reactants are consumed unevenly within the reactor column. Uneven consumption of reactants gives rise to a concentration gradient. The concentration gradient, in many cases, is also accompanied by a temperature gradient across a cross-sectional area of the reactor column. For this reason, reactor columns often include various mixing and distribution devices.

U.S. Pat. No. 7,078,002, assigned to Shell Oil Company, describes a mixing device for mixing fluids in a multiple-bed downflow reactor. The mixing device includes a substantially horizontal collection tray and a swirl chamber arranged below the substantially horizontal collection tray for mixing liquid. The swirl chamber has an upper end part that is in direct fluid communication with an upper surface of the substantially horizontal collection tray and an outlet opening at a lower end. A length of the swirl chamber is at least 0.35 times its inner diameter. The mixing device further includes a substantially horizontal distribution tray beneath the swirl chamber. The substantially horizontal distribution tray includes a plurality of openings for downward flow of liquid and gas.

U.S. Pat. No. 7,052,654, assigned to ExxonMobil Research and Engineering Company, describes a multi-phase mixing system for distributing vapor and liquid across a downflow reactor. The mixing system includes a collection tray for receiving vapor and liquid. The collection tray includes a sub-region. The mixing system further includes a mixing chamber positioned below the collection tray and at least one outlet opening for downward passage of vapor and liquid. The mixing system further includes a conduit extending through the collection tray into the mixing chamber. The conduit permits the flow of vapor and liquid from above the collection tray and into the mixing chamber. The mixing system further includes a vapor slipstream passageway extending through the upwardly projecting sub-region for permitting flow of a vapor slipstream from above the collection tray into the mixing chamber.

U.S. Pat. No. 7,045,103, also assigned to ExxonMobil Research and Engineering Company, describes a distributor system for distributing vapor and liquid across a downflow reactor. The distributor system includes a collection tray for receiving vapor and liquid and a mixing chamber positioned below the collection tray. The mixing chamber has an outlet oriented to permit downward passage of liquid and vapor from the mixing chamber. The distribution system further includes a spillway extending through the collection tray to permit downward passage of vapor and liquid from above the collection tray into the mixing chamber. The distribution system further includes a baffle connected to the collection tray and extending downwardly therefrom into the mixing chamber. The baffle is located between the outlet and the spillway such that a baffle radius is greater than an outlet radius.

SUMMARY

The present application relates generally to hydrotreating processes and more particularly, but not by way of limitation, to improved methods and systems for reactant mixing and distribution in hydrotreating reactors. One aspect of the present invention relates to a mixing system for use in a chemical-process column. The mixing system includes a heavy-reactant mixing surface arranged perpendicular to a flow of reactant through the chemical-process column. The mixing system also includes an aperture formed in the heavy-reactant mixing surface. A pre-distributor is coupled to an underside of the mixing system and fluidly coupled to the aperture.

Another aspect of the present invention relates to a method of mixing reactants in a chemical-process column. The method includes introducing a heavy reactant to a mixing region of the chemical process column and contacting a heavy reactant with a heavy-reactant mixing surface. The method further includes homogenizing the heavy reactant within a mixing pot. The method further includes distributing the heavy reactant via a pre-distributor.

BRIEF DESCRIPTION OF THE DRAWINGS

A more complete understanding of the method and system of the present invention may be obtained by reference to the following Detailed Description when taken in conjunction with the accompanying drawings wherein.

DETAILED DESCRIPTION

Various embodiments of the present invention will now be described more fully with reference to the accompanying drawings. The invention may, however, be embodied in many different forms and should not be construed as limited to the embodiments set forth herein; rather, the embodiments are provided so that this disclosure will be thorough and complete, and will fully convey the scope of the invention to those skilled in the art.

Figure 1:
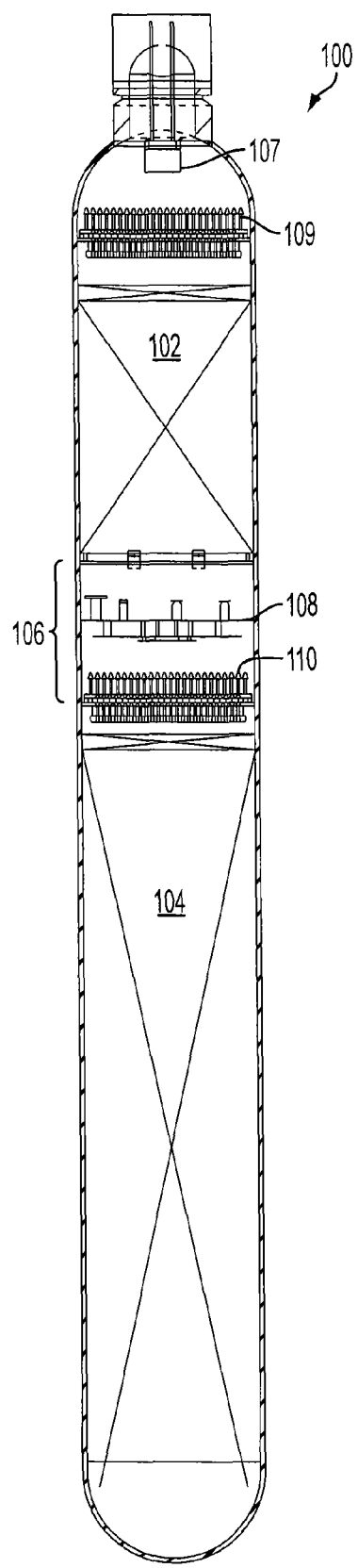
FIG. 1 is a cross-sectional view of a reactor column according to an exemplary embodiment.

FIG. 1 is a cross-sectional view of a reactor column according to an exemplary embodiment. In a typical embodiment, a reactor column 100 includes an upper catalyst bed 102 disposed above a lower catalyst bed 104. A feed device 107 and a primary distributor 109 are disposed above the upper catalyst bed 102. A mixing region 106, including a mixing system 108 and a secondary distributor 110, is arranged between the upper catalyst bed 102 and the lower catalyst bed 104. In a typical embodiment, the upper catalyst bed 102 and the lower catalyst bed 104 are filled with a plurality of generally spherical catalyst pellets (not explicitly shown). In various embodiments, particularly in hydrodesulfurization processes, the catalyst may include an alumina base impregnated with, for example, cobalt (Co) and molybdenum (Mo), known as a "CoMo catalyst." In certain other embodiments, a catalyst containing a combination of nickel (Ni) and molybdenum (Mo), known as a "NiMo catalyst," is utilized.

Still referring to FIG. 1, during operation, reactants are introduced to the reactor column 100 via the feed device 107. For example, in hydrodesulfurization processes, the reactants may include a heavy reactant such as, for example, ethanethiol ($C_2H_5SH$) and a light reactant such as, for example, hydrogen vapor ($H_2$). The reactants descend through the primary distributor 109, through the upper catalyst bed 102, and react on a surface of the catalyst pellets. The reactants enter the mixing region 106 where the reactants pass through the mixing system 108 and the secondary distributor 110. The mixing system 108 blends and homogenizes the reactants thereby removing concentration gradients and temperature gradients resulting from uneven or partial reaction of the reactants in the upper catalyst bed 102. The secondary distributor 110 evenly distributes the reactants across a cross-sectional area of the reactor column 100. After leaving the mixing region 106, the reactants move to the lower catalyst bed 104 for further reaction.

Figure 2A:
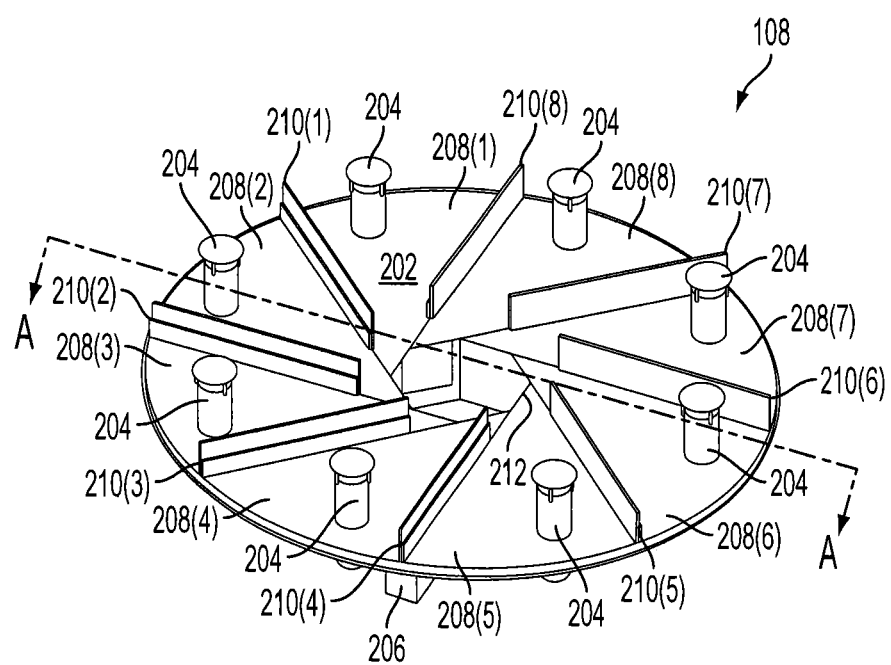
FIG. 2A is a top isometric view of a mixing system according to an exemplary embodiment.

FIG. 2A is a top isometric view of a mixing system according to an exemplary embodiment. In a typical embodiment, the mixing system 108 includes a heavy-reactant mixing surface 202, at least one light-reactant duct 204 is disposed on the heavy-reactant mixing surface 202, and a pre-distributor 206 disposed below the heavy-reactant mixing surface 202. In a typical embodiment, the mixing system 108 is oriented generally perpendicular to a flow of reactants within the reactor column 100 (illustrated in FIG. 1). The mixing system 108 is generally circular with a diameter that is generally coextensive with an inner diameter of the reactor column 100. The heavy-reactant mixing surface 202 includes a plurality of generally wedge shaped sections 208(1)-(8). A plurality of baffles 210(1)-(8) are arranged on the heavy-reactant mixing surface 202. The plurality of baffles 210(1)-(8) are arranged generally perpendicular to the heavy-reactant mixing surface 202.

Figure 2B:
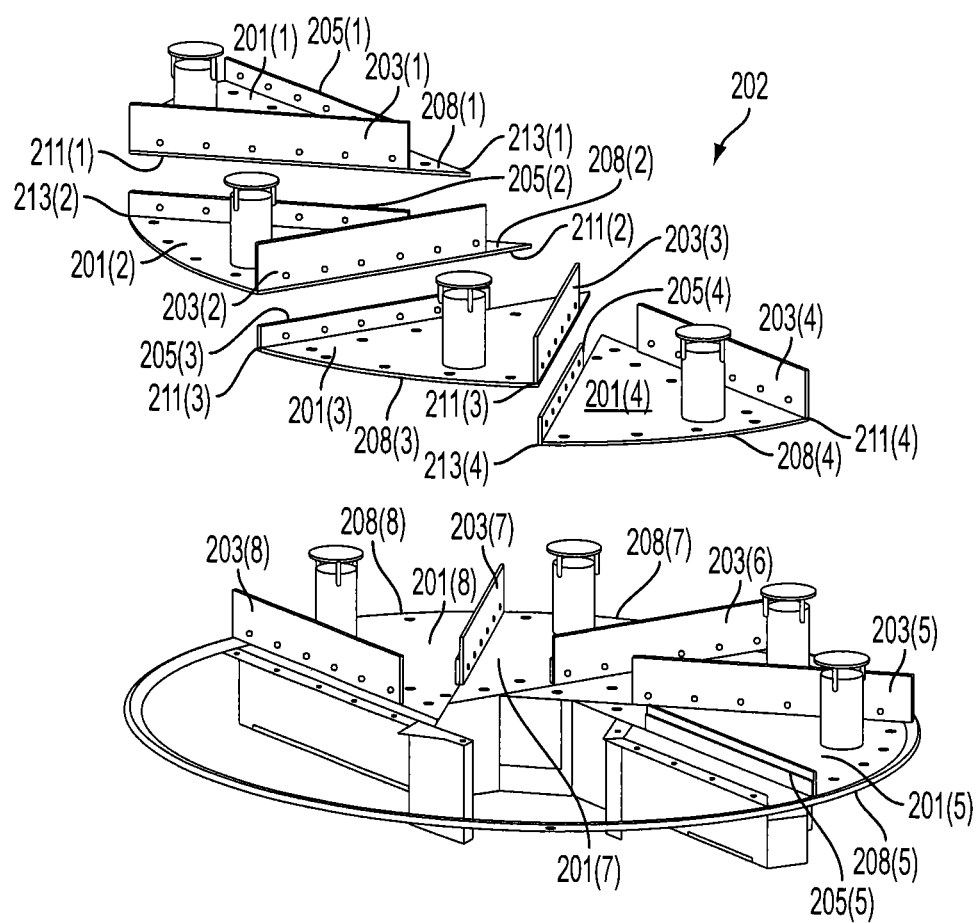
FIG. 2B is an exploded perspective view of a heavy-reactant mixing surface according to an exemplary embodiment.

FIG. 2B is an exploded view of the heavy-reactant mixing surface 202. The generally wedge shaped section 208(1) includes a body portion 201(1), a first flange 203(1) formed along a first edge 211(1), and a second flange 205(1) formed along a second edge 213(1). The first flange 203(1) and the second flange 205(1) are formed generally perpendicular to the body portion 201(1). The generally wedge shaped sections 208(2)-(8) are similar in terms of construction and operation to the generally wedge shaped section 208(1).

Referring to FIGS. 2A-2B, the plurality of generally wedge shaped sections 208(1)-(2) are assembled such that the first edge 211(1) of the generally wedge shaped section 208(1), abuts the second edge 213(2) of the generally wedge shaped section 208(2). The first flange 203(1) abuts the second flange 205(2) to form the baffle 210(1). Similarly, the plurality of generally wedge shaped sections 208(2)-(3) are assembled such that the first edge 211(2) of the generally wedge shaped section 208(2) is arranged to abut the second edge 213(3) of the generally wedge shaped section 208(3). The first flange 203(2) abuts the second flange 205(3) to form the baffle 210(2). The generally wedge shaped sections 208(3)-(8) are assembled in similar fashion thereby forming the baffles 210(3)-(8). The plurality of generally wedge shaped sections 208(1)-(8) are thus arranged into a generally annular shape.

Referring again to FIG. 2A, a central aperture 212, defined by the plurality of generally wedge shaped sections 208(1)-(8), is disposed in an approximate center of the heavy-reactant mixing surface 202. During operation, heavy reactant contacts the heavy-reactant mixing surface 202. The heavy reactant is directed towards the central aperture 212 by the plurality of baffles 210(1)-(8). Mixing and homogenization of the heavy reactant occurs in the central aperture 212. In other embodiments, mixing systems utilizing principles of the invention may include a different number of generally wedge shaped sections. In still other embodiments, mixing systems utilizing principles of the invention may include a unitary mixing surface thereby omitting the generally wedge shaped sections 208(1)-(8). In such embodiments, the baffles 210(1)-(8) may be coupled to the heavy-reactant mixing surface through a process such as, for example, welding, soldering, or the like.

Figure 3A:
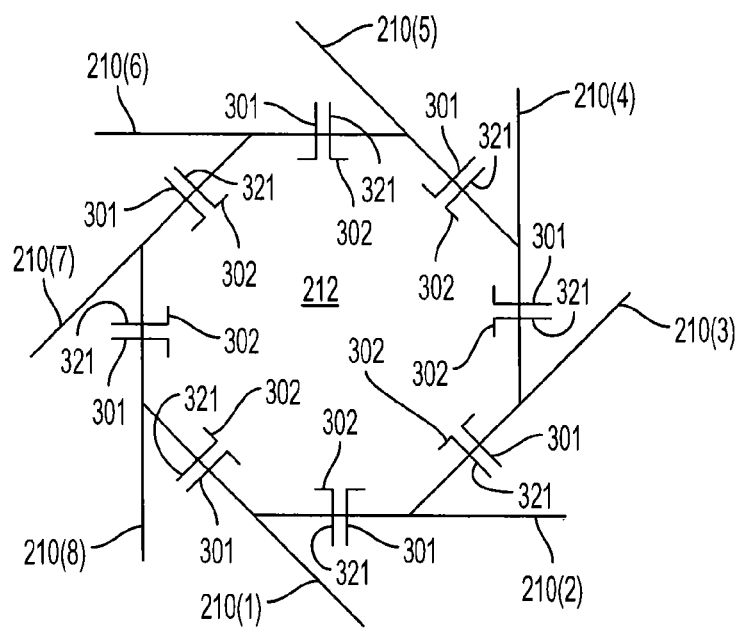
FIGS. 3A-3H are detailed plan views of a central aperture according to exemplary embodiments.

FIGS. 3A-3H are detailed plan views of the central aperture 212 according to exemplary embodiments. Referring first to FIG. 3A, a first vane 301 and a second vane 321 are arranged around a perimeter of the central aperture 212 and disposed between adjacent ones of the plurality of baffles 210(1)-(8). The first vane 301 and the second vane 321 include a substantially right-angle section 302. The substantially right-angle section 302 disrupts flow of heavy reactant entering the central aperture 212 thereby inducing turbulent mixing of the heavy reactant.

Figure 3B:
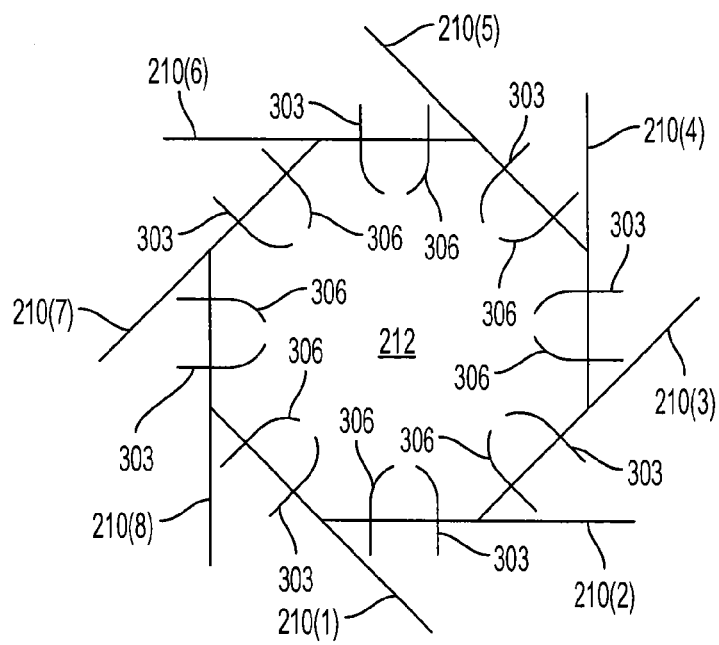

Referring to FIG. 3B, a first vane 303 and a second vane 306 are arranged around the perimeter of the central aperture 212 and disposed between adjacent ones of the plurality of baffles 210(1)-(8). The first vane 303 and the second vane 306 are curved towards each other thus creating a plurality of nozzles 304. The first vane 303 and the second vane 306, in combination with the plurality of nozzles 304, disrupt flow of heavy reactant entering the central aperture 212 thereby inducing turbulent mixing of the heavy reactant.

Figure 3C:
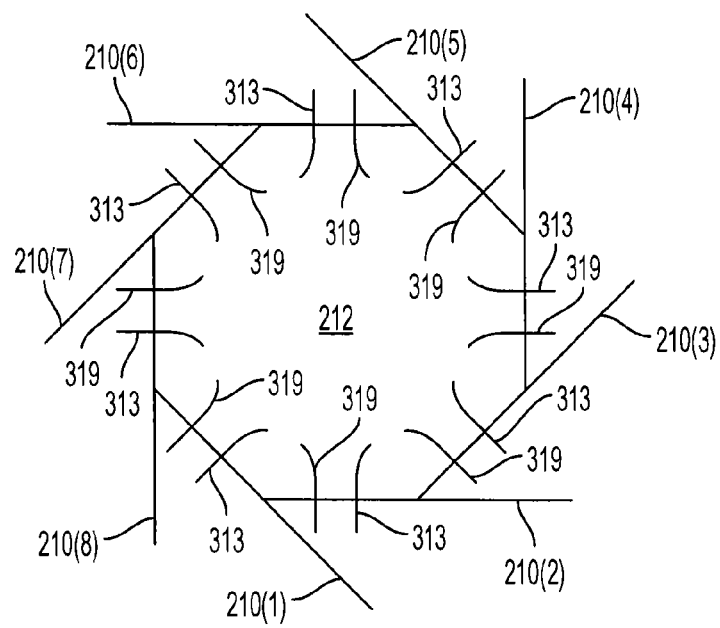

Referring to FIG. 3C, a first vane 313 and a second vane 319 are arranged around the perimeter of the central aperture 212 and disposed between adjacent ones of the plurality of baffles 210(1)-(8). The first vane 313 and the second vane 319 are curved away from each other. The first vane 313 and the second vane 319 disrupt flow of heavy reactant entering the central aperture 212 thereby inducing turbulent mixing of the heavy reactant.

Figure 3D:
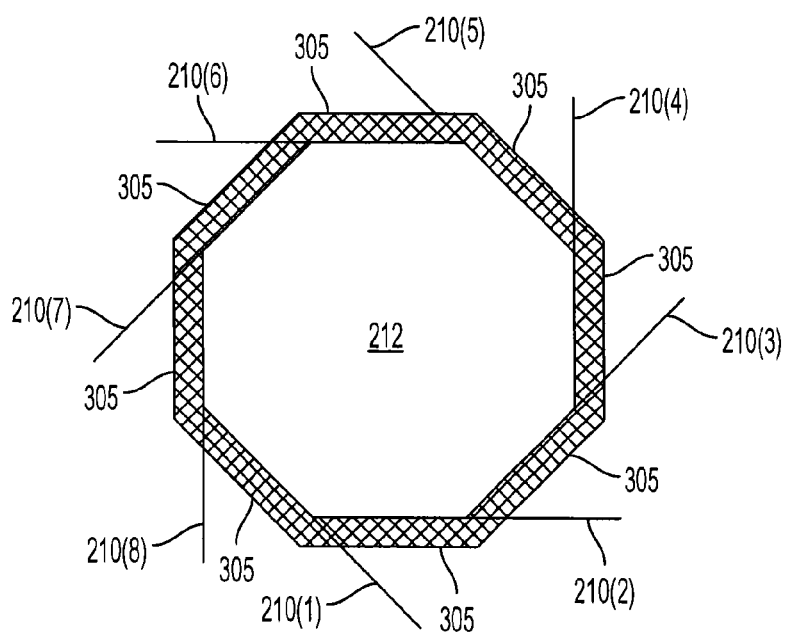

Referring now to FIG. 3D, a static mixer 305 is around the perimeter of the central aperture 212. The static mixer 305 is disposed between adjacent ones of the plurality of baffles 210(1)-(8). The static mixer 305 may include, for example, a plurality of crimped sheets of material. The static mixer 305 induces turbulent mixing of the heavy reactant entering the central aperture 212.

Figure 3E:
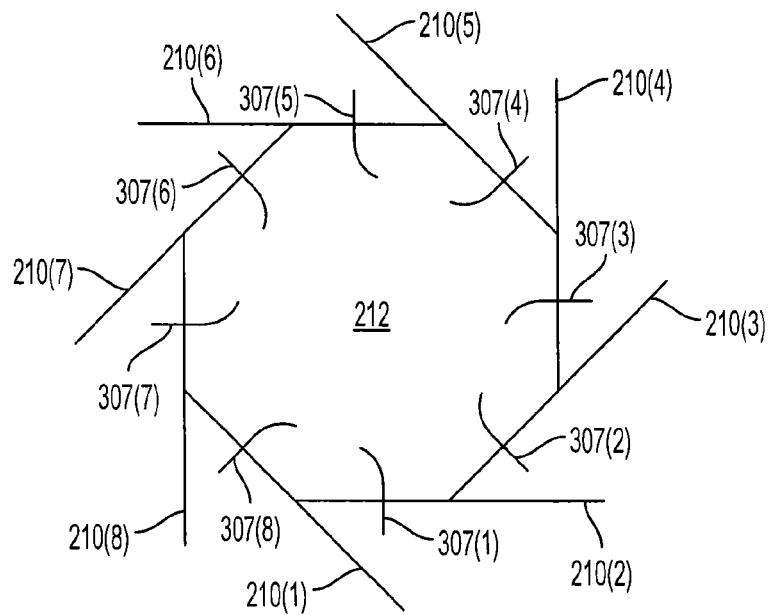

Referring to FIG. 3E, a plurality of vanes 307(1)-(8) are arranged around the perimeter of the central aperture 212. The vane 307(1) is disposed between the baffles 210(1)-(2). The vanes 307(2)-(8) are arranged similarly. The vanes 307(1), 307(3), 307(5), 307(7) are curved in a direction opposite that of the vanes 307(2), 307(4), 307(6), 307(8). The plurality of vanes 307(1)-(8) induces turbulent mixing of the heavy reactant entering the central aperture 212.

Figure 3F:
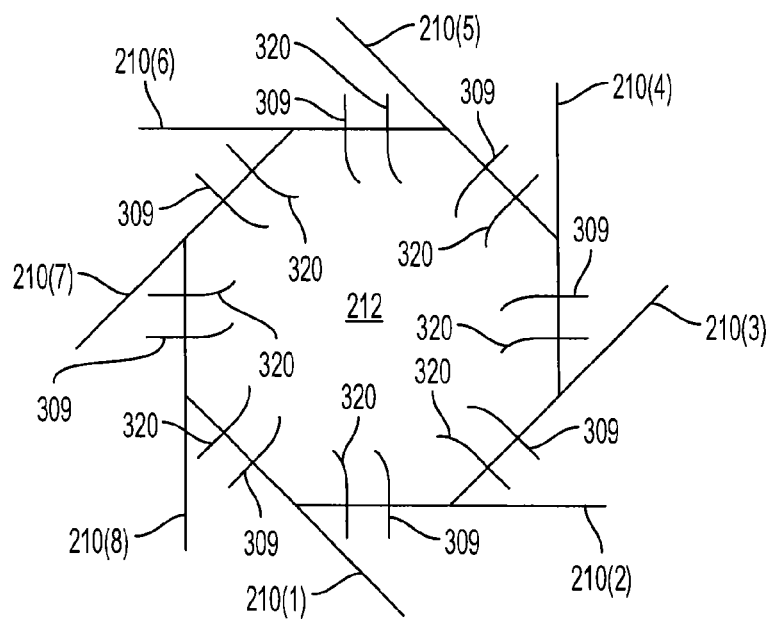

Referring to FIG. 3F, a first vane 309 and a second vane 320 are arranged around the perimeter of the central aperture 212 and disposed between adjacent ones of the plurality of baffles 210(1)-(8). The first vane 309 and the second vane 320 are arranged generally parallel to each other and are curved in a similar direction thus creating a stirring effect of the heavy reactant entering the central aperture 212.

Figure 3G:
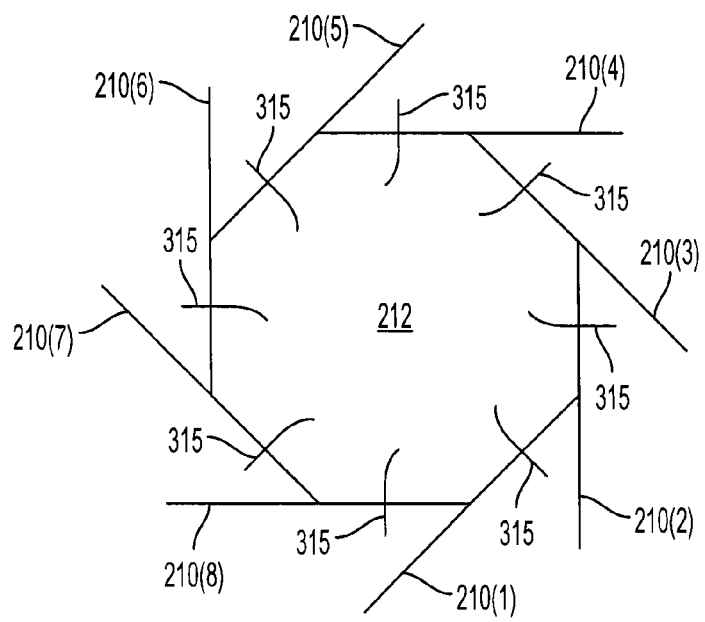

Referring to FIG. 3G, a vane 315 is arranged around the perimeter of the central aperture 212. The vane 315 is disposed between adjacent ones of the plurality of baffles 210(1)-(8). The vane 315 is curved thus creating a stirring effect of the heavy reactant entering the central aperture 212.

Figure 3H:
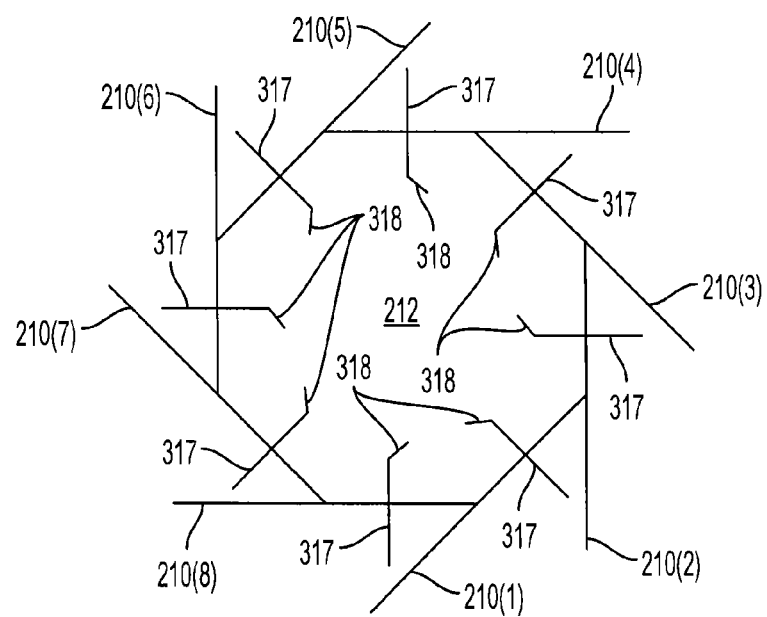

Referring to FIG. 3H, a vane 317 is arranged around the perimeter of the central aperture 212. The vane is disposed between adjacent ones of the plurality of baffles 210(1)-(8). The vane 317 includes a right-angle section 318. The right-angle section 318 disrupts flow of the heavy reactant thereby further inducing turbulent mixing of the heavy reactant entering the central aperture 212.

Figure 4:
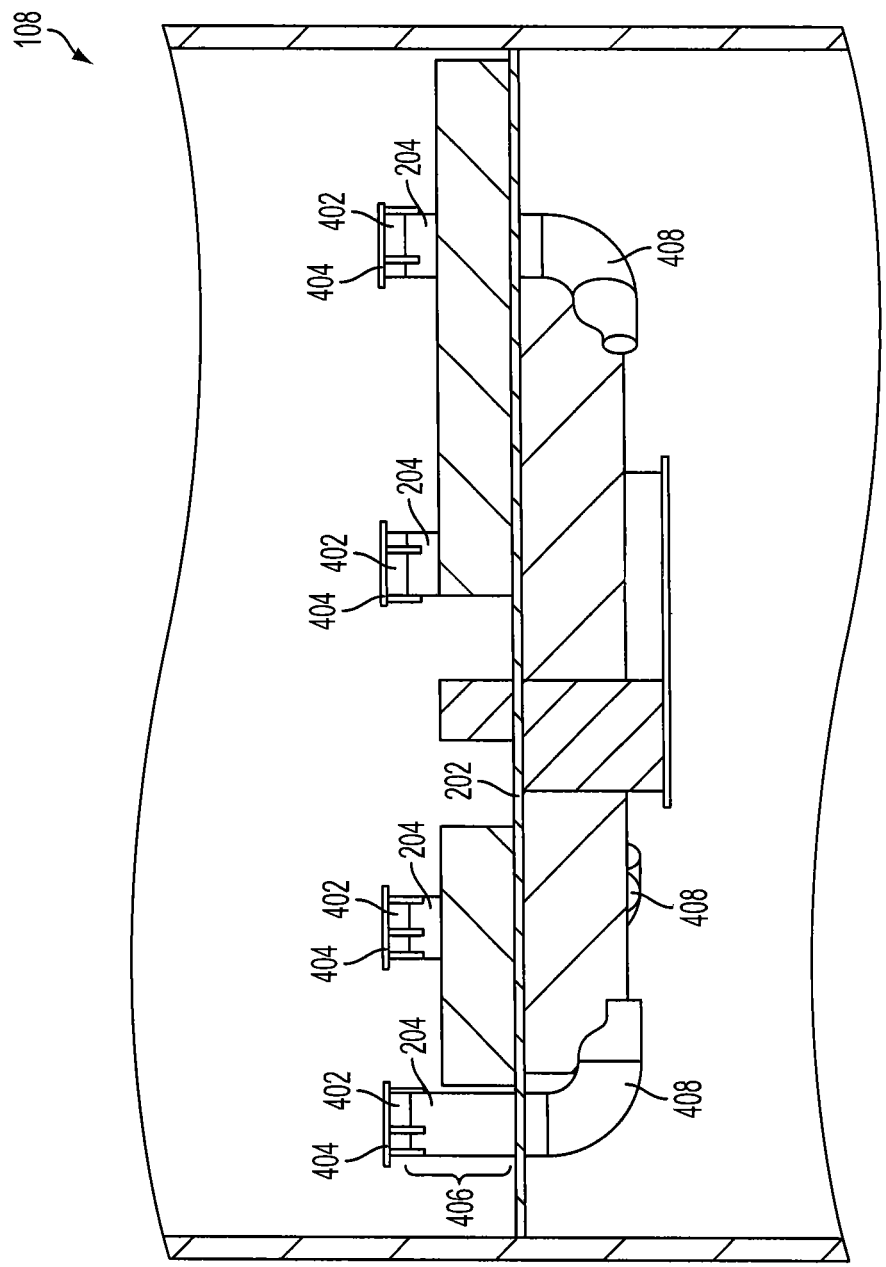
FIG. 4 is a cross-sectional view of a mixing system taken across section line A-A of FIG. 2A according to an exemplary embodiment.

FIG. 4 is a cross-sectional view of the mixing system 108 taken across section line A-A of FIG. 2A. The at least one light-reactant duct 204 is disposed through the heavy-reactant mixing surface 202. The at least one light-reactant duct 204 includes an aperture 402 having a cover 404 disposed thereabove. The aperture 402 is fluidly coupled to a riser 406 and is, thus, positioned above the heavy-reactant mixing surface 202. The riser 406 is fluidly coupled to a vectoring member 408 disposed below the heavy-reactant mixing surface 202. The vectoring member 408 may include, for example, a nozzle, a tube, a vane, or any other appropriate device as dictated by design requirements. The at least one light-reactant duct 204 permits passage of the light reactant from a region above the heavy-reactant mixing surface 202 to a region below the heavy-reactant mixing surface 202. The vectoring member 408 imparts velocity and turbulence to the light reactant thereby improving mixing and homogenization thereof.

Figure 5:
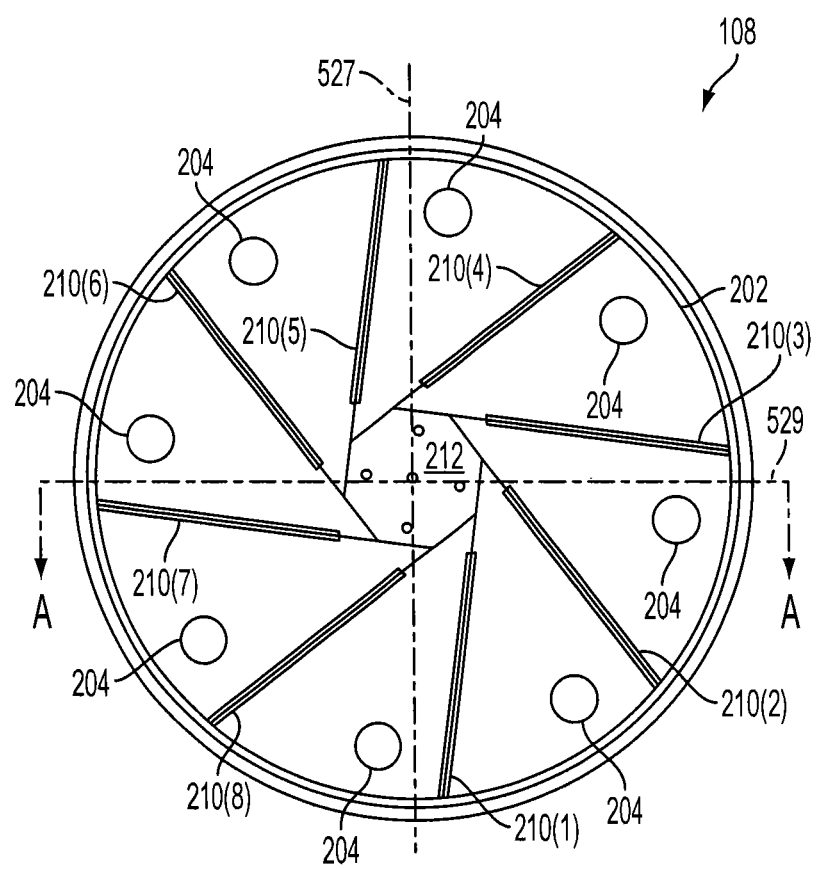
FIG. 5 is a top plan view of a mixing system according to an exemplary embodiment.

FIG. 5 is a top plan view of the mixing system 108. The baffles 210(1)-(8) may be arranged at any angle with respect to a vertical axis 527 and a horizontal axis 529. In the embodiment shown in FIG. 5, a plurality of light-reactant ducts 204 are arranged in a generally circular fashion around the central aperture 212. In other embodiments, the at least one light-reactant duct 204 may be arranged in any configuration as dictated by design requirements. The at least one light-reactant duct 204 permits passage of the light reactant from a region above the heavy-reactant mixing surface 202 to a region below the heavy-reactant mixing surface 202.

Figure 6:
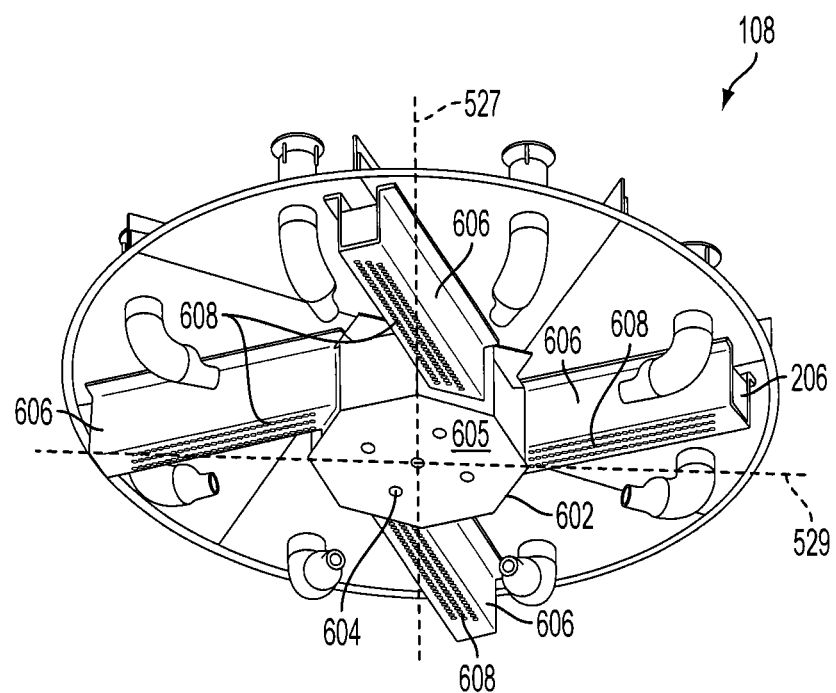
FIG. 6 is a bottom isometric view of a mixing system according to an exemplary embodiment.

FIG. 6 is a bottom isometric view of the mixing system 108 according to an exemplary embodiment. The pre-distributor 206 is coupled to an underside of the mixing system 108. The pre-distributor 206 includes at least one channel 606 fluidly coupled to a mixing pot 602. The mixing pot 602 is in fluid communication with the heavy-reactant mixing surface 202 via the central aperture 212 (shown in FIG. 2A). The mixing pot 602 is disposed on a bottom surface of the mixing system 108 below the heavy-reactant mixing surface 202. In various embodiments, additional vanes, fins, tabs, or other turbulence-inducing features may also be present within the mixing pot 602. A plurality of perforations 604 are present in a bottom surface 605 of the mixing pot 602. In a typical embodiment, turbulent mixing and blending of the heavy reactant is induced upon entering the mixing pot 602. Mixing and blending of the heavy reactant homogenizes the heavy reactant thereby removing concentration and temperature gradients that may be present due to partial or uneven reaction.

Still referring to FIG. 6, the at least one channel 606 extends outwardly in a radial fashion from the mixing pot 602. The at least one channel 606 includes a plurality of perforations 608 formed therein. During operation, the at least one channel 606 distributes homogenized heavy reactant over a cross sectional area of the reactor column 100 (shown in FIG. 1). In a typical embodiment, the at least one channel 606 includes a generally square or rectangular profile. However, in other embodiments, alternative profile shapes such as, for example, round, triangular, or polygonal could be utilized. In various embodiments, the at least one channel 606 includes flanged or welded pipes. In various embodiments, the at least one channel 606 may include any number of channels. Furthermore, in various embodiments, the at least one channel 606 may be arranged at any angle relative to each other or to the horizontal axis 529 or the vertical axis 527.

Figure 7:
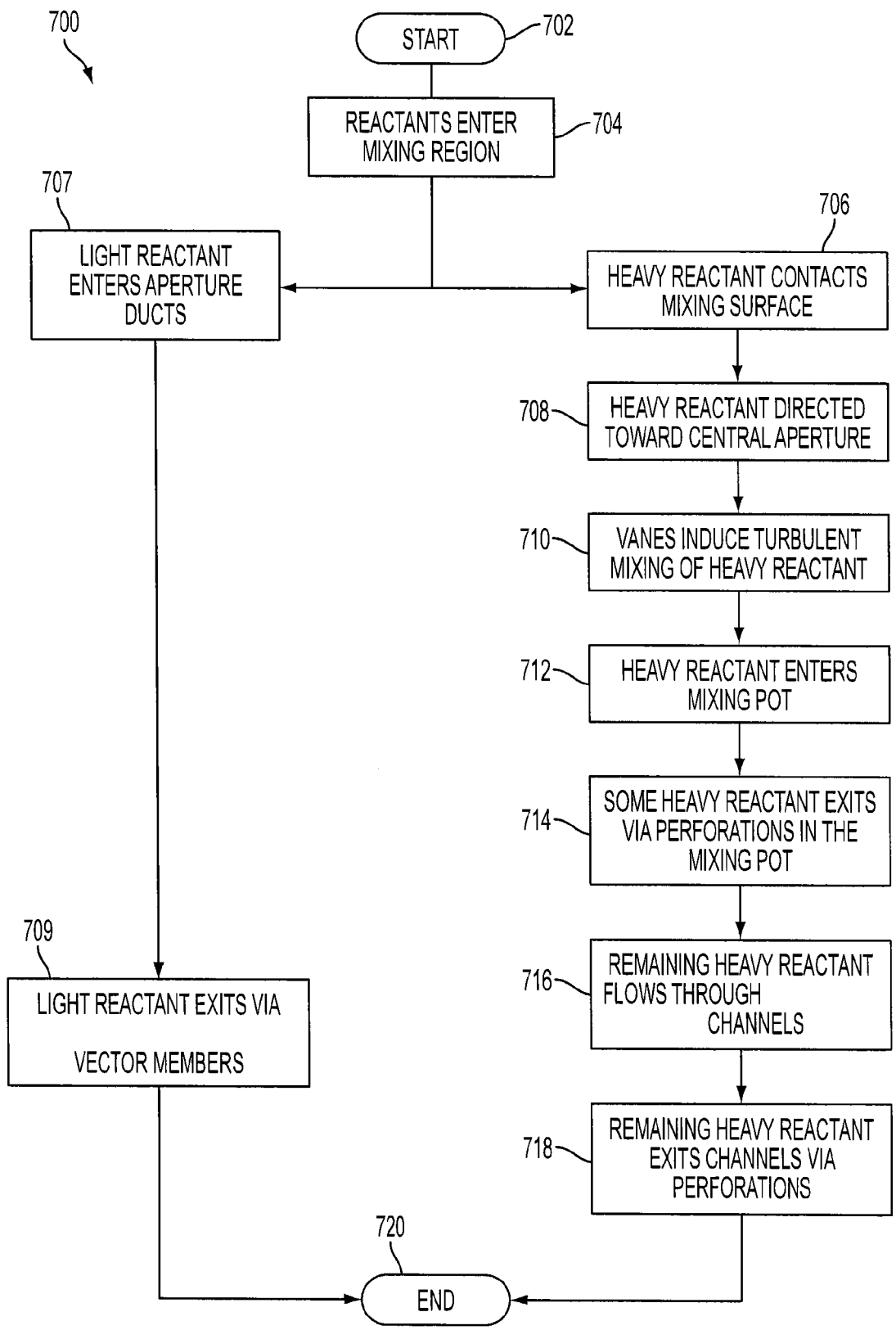
FIG. 7 is a flow diagram of a process for mixing and distributing a reactant according to an exemplary embodiment.

FIG. 7 is a flow diagram of a process for mixing and distributing reactants according to an exemplary embodiment. The process 700 begins at step 702. At step 704 reactants including, for example, a light reactant and a heavy reactant, enter the reactor column 100, descend through the upper catalyst bed 102, and enter the mixing region 106. At step 706, the heavy reactant contacts the heavy-reactant mixing surface 202 of the mixing system 108. At step 707, the light reactant enters the at least one light-reactant duct 204 and is directed beneath the mixing system 108. At step 708, the baffles 210(1)-(8) direct the heavy reactant towards the central aperture 212. At step 709, the light reactant exits via the vectoring member 408 such as, for example, nozzles, tubes, vanes, and the like. At step 710, as shown in FIGS. 3A-3H, in various embodiments, turbulent mixing and blending of the heavy reactant is induced upon entering the central aperture 212. In a typical embodiment, the mixing and blending homogenizes the heavy reactant thereby removing concentration and temperature gradients that may be present due to partial or uneven reaction.

Referring still to FIG. 7, at step 712, the heavy reactant enters the mixing pot 602 where further blending of the heavy reactant occurs. At step 714, a portion of the heavy reactant exits the mixing pot 602 via, for example, the plurality of perforations 604 disposed on the bottom surface 605 of the mixing pot 602. At step 716, remaining heavy reactant flows through all or a portion of the at least one channel 606. At step 718, the remaining heavy reactant exits the at least one channel 606 through the plurality of perforations 608. Thus, the at least one channel 606 distributes homogenized heavy reactant over a cross sectional area of the reactor column 100. The process 700 ends at step 720.

The advantages attendant to the mixing system 108 will be apparent to those skilled in the art. First, the mixing system 108 combines the functions of reactant mixing and reactant pre-distribution into a single component thus allowing for cheaper and less complicated assembly and maintenance. Moreover, the mixing system 108 allows for increased catalyst volume or a smaller column profile. In addition, as shown in FIGS. 3A-3H, the mixing system 108, induces turbulent mixing and blending of heavy reactant entering the central aperture 212. Such turbulent mixing and blending improves over designs where reactants are simply stirred or swirled. Stirring reactants often does not induce turbulent mixing and, as a result, often does not result in homogenized reactants.

Although various embodiments of the method and system of the present invention have been illustrated in the accompanying Drawings and described in the foregoing Detailed Description, it will be understood that the invention is not limited to the embodiments disclosed, but is cable of numerous rearrangements, modifications and substitutions without departing from the spirit of the invention as set forth herein.

What is claimed is:

1. A mixing system for use in a chemical-process column, the mixing system comprising:
   a heavy-reactant mixing surface arranged perpendicular to a flow of a reactant through the chemical-process column, the heavy-reactant mixing surface comprising a plurality of wedge-shaped regions around a central aperture;
   an upstanding baffle being disposed between each region of the plurality of wedge-shaped regions;
   a pre-distributor coupled beneath the heavy-reactant mixing surface, the pre-distributor comprising:
   a mixing pot fluidly coupled to the central aperture;
   a channel fluidly coupled to, contiguous with, and extending radially from, the mixing pot, the channel extending substantially to an edge of the heavy-reactant mixing surface, the channel integrally formed with and contiguous to an underside of the heavy-reactant mixing surface; and
   wherein heavy reactant is directed toward the central aperture.

2. The mixing system of claim 1, comprising a baffle formed on the heavy-reactant mixing surface, the baffle extending outwardly from the central aperture.

3. The mixing system of claim 1, comprising a plurality of vanes disposed at an entrance to the central aperture.

4. The mixing system of claim 1, wherein the heavy-reactant mixing surface comprises a plurality of wedge shaped sections.

5. The mixing system of claim 1, comprising a light-reactant duct disposed through the heavy-reactant mixing surface.

6. The mixing system of claim 5, wherein the light-reactant duct comprises:
   a riser disposed on the heavy-reactant mixing surface;
   a vectoring member disposed beneath the heavy-reactant mixing surface and fluidly coupled to the riser; and
   a second aperture formed in the riser.

7. The mixing system of claim 5, wherein the light-reactant duct comprises a plurality of light-reactant ducts arranged in a generally circular pattern on the heavy-reactant mixing surface.

8. The mixing system of claim 1, wherein the channel comprises a first plurality of perforations formed therein.

9. The mixing system of claim 8, wherein at least one of a vane, a deflector, a baffle, or a static mixer is disposed within the mixing pot.

10. The mixing system of claim 8, wherein a second plurality of perforations are formed in a bottom surface of the mixing pot.

11. The mixing system of claim 8, wherein the channel comprises a plurality of channels extending outwardly from the mixing pot in a radial orientation.

* * * * *